(No Model.) 2 Sheets—Sheet 2.
E. GEORGE.
CULTIVATOR.
No. 461,077. Patented Oct. 13, 1891.
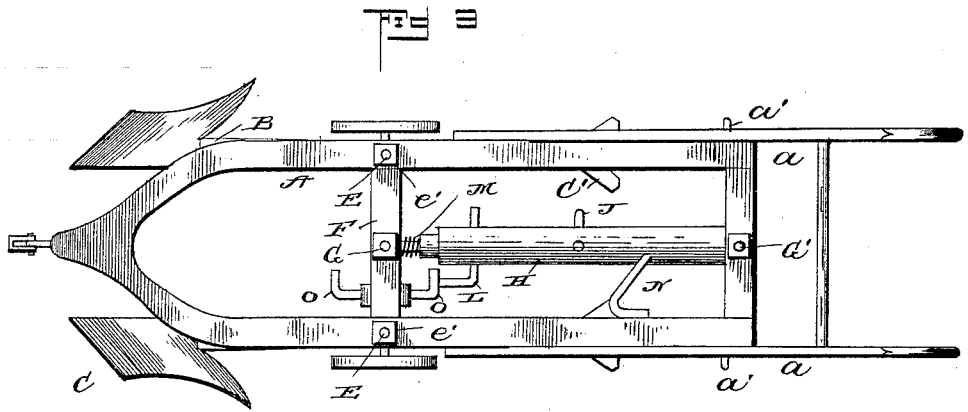
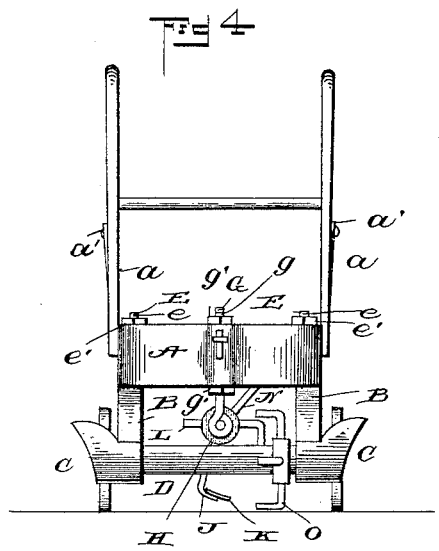
Witnesses
John Tairrie
Inventor
Elias George,
By his Attorney
J. R. Littell

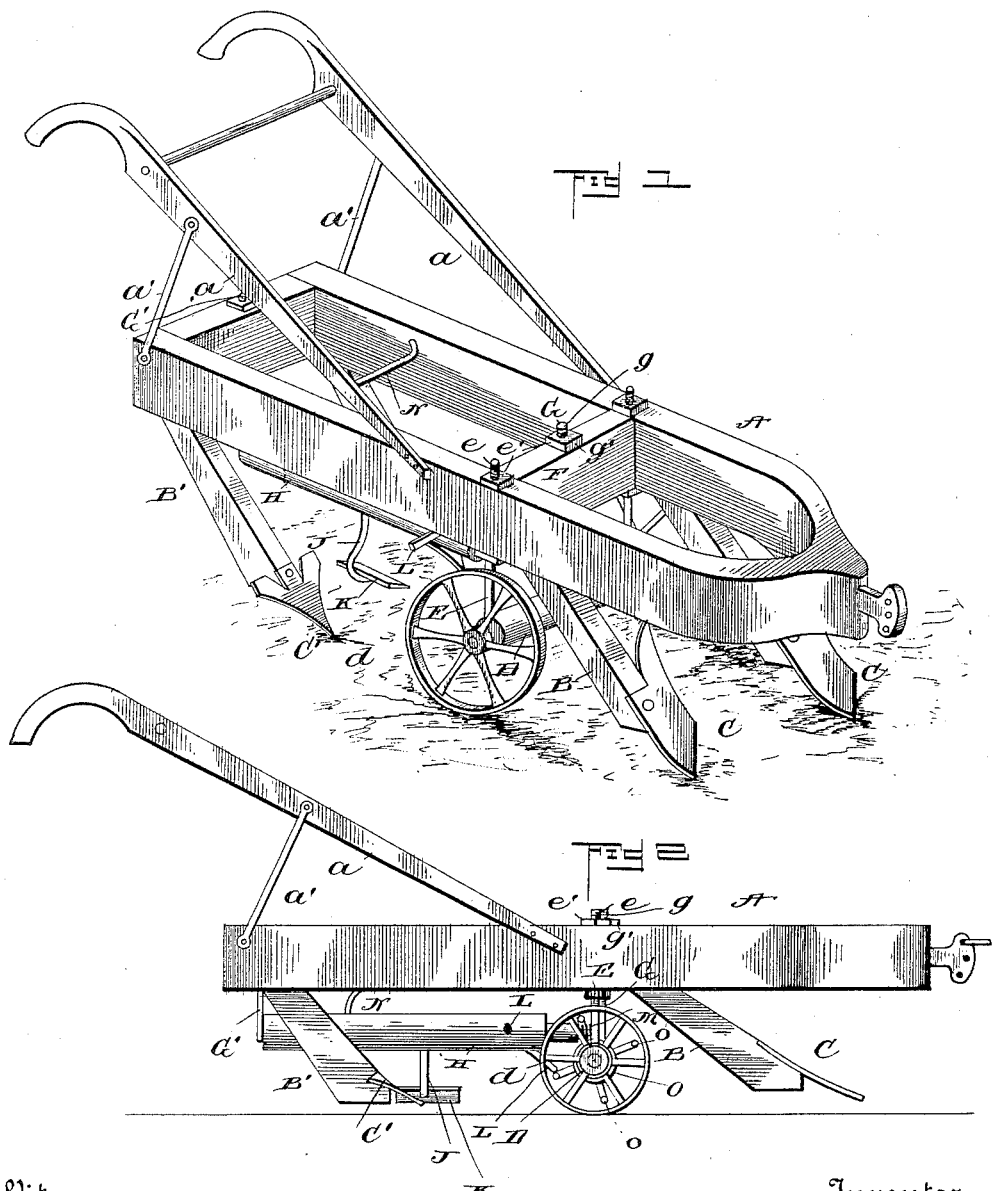

UNITED STATES PATENT OFFICE.

ELIAS GEORGE, OF CHERRY RIDGE, LOUISIANA.

CULTIVATOR.

SPECIFICATION forming part of Letters Patent No. 461,077, dated October 13, 1891.

Application filed May 21, 1891. Serial No. 393,619. (No model.)

*To all whom it may concern:*

Be it known that I, ELIAS GEORGE, a citizen of the United States, residing at Cherry Ridge, in the parish of Union and State of Louisiana, have invented certain new and useful Improvements in Cultivators; and I do hereby declare that the following is a full, clear, and exact description of the invention, which will enable others skilled in the art to which it appertains to make and use the same.

My invention relates to certain new and useful improvements in cultivators, and is more especially intended for the purpose of "chopping" or cutting out cotton, corn, peas, potatoes, and the like; and it consists in the novel construction and arrangement of parts hereinafter fully described, and afterward definitely pointed out in the claims, due reference being had to the accompanying drawings, forming a part of this specification, wherein—

Figure 1 is a perspective view of my improved machine; Fig. 2, a side elevation thereof; Fig. 3, a top plan view, and Fig. 4 an end view looking from the front.

Referring to said drawings, the letter A indicates a frame substantially rectangular in shape and provided at its forward end with any suitable or approved form of clevis by means of which the implement may be drawn. To the side bars of the frame A are secured the handles $a$ $a$, which are re-enforced by braces $a'$ $a'$, as shown. To the forward and under side of each of the side bars of the frame A are secured forwardly-inclined standards B, carrying scrapers C, and similar standards B' are secured to the rear of the frame, carrying shovel-plows C'.

D indicates an axle having rigidly mounted upon each end a wheel $d$. The axle D is supported in hangers E E, having journals in their lower extremities, the upper portions thereof passing through the side bars of the frame A. The hangers E E are screw-threaded, as at $e$, and provided with nuts $e'$ $e'$, by means of which the axle and wheels may be raised or lowered to adjust the depth of penetration of the plows and scrapers.

Between the side bars of the frame, and preferably at a point over the axle D, is secured by bolts or other suitable means a beam F, passing through the center of which is a hanger G, provided at its lower extremity with a journal and screw-threaded, as at $g$ $g$, and provided with nuts $g'$ $g'$, by means of which it may be adjusted up or down. In the rear of the frame is secured a like hanger G', adjusted up and down in like manner to the hanger G.

H indicates a shaft, its ends having bearings in the journals formed at the lower extremities of the hangers G G' and carrying a downwardly-projecting arm J, preferably curved, as shown, to the lower extremity of which is secured a cutter K.

Near the forward end of the shaft H is secured an arm L, inclined downwardly and forward, for the purpose hereinafter described.

To one end of the shaft H is secured one end of a coiled spring M, which is wound around said shaft, its other end being fastened to the beam F, said spring constantly exerting its force to rotate the shaft H.

At any suitable point on the shaft H is secured an arm N, which strikes one of the side bars of the frame A and limits or stops the rotation of the shaft H.

O indicates a collar rigidly secured upon the axle D, its periphery provided with screw-threaded sockets, within which are secured arms $o$ $o$, the outer ends of which are curved inwardly and when the axle D is rotated successively engage the end of the arm L and cause a partial revolution of the shaft H.

The operation of the implement will be readily apparent. The scrapers and plows will clear and pulverize the soil, and the revolution of the axle D will cause the arms $o$ $o$ to engage the arm L and partially rotate the shaft H, thus communicating to the cutter K a lateral sweeping movement, the spring M returning the shaft H to its normal position, its rotation being arrested by the arm N striking against the side bar of the frame A.

Having described my invention, what I claim is—

1. In a cultivator, the combination, with the frame, of a rotatable axle supporting the same and provided with a series of radially-disposed arms projecting therefrom, a shaft provided with a cutter and with a projecting arm adapted to be engaged by the arms upon the axle to partially rotate the shaft, and means for returning the latter to its normal position, substantially as and for the purpose set forth.

2. In a cultivator, the combination, with the frame, of a transversely-disposed rotatable axle supporting the same and provided with a series of radially-disposed arms projecting therefrom, a horizontally-disposed spring-held shaft provided with a cutter, an arm projecting therefrom and adapted to be engaged by the arms upon the axle, and a stop for limiting the movement of the shaft, the latter and the axle being vertically adjustable, substantially as and for the purpose set forth.

3. In a cultivator, the combination, with the frame carrying scrapers and plows, of a vertically-adjustable axle supporting the frame and provided with radially-disposed arms projecting therefrom, a horizontally-disposed shaft located at right angles to the axle and provided with a scraper and with an arm adapted to be engaged by the arms upon the axle, a spring for returning the shaft to its normal position, and a stop projecting from said shaft and adapted to engage the frame, substantially as and for the purpose set forth.

In testimony whereof I affix my signature in presence of two witnesses.

ELIAS GEORGE.

Witnesses:
O. C. DANKINS,
W. W. HEARD.